United States Patent Office.

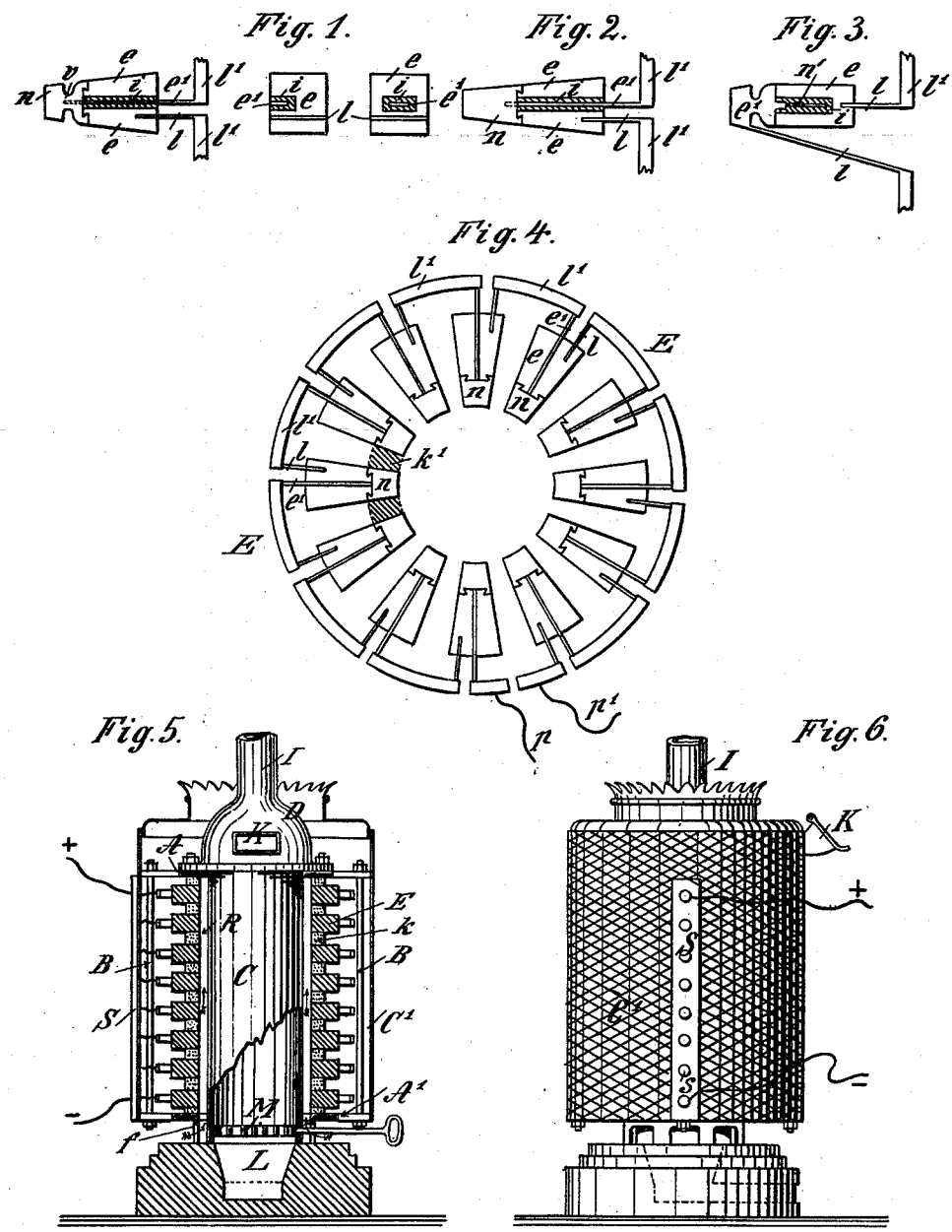

DANIEL LAUTENSACK, OF VIENNA, AUSTRIA-HUNGARY, ASSIGNOR OF TWO-THIRDS TO ADOLF KOHN AND OSKAR LASKE, BOTH OF SAME PLACE.

THERMO-ELECTRIC BATTERY.

SPECIFICATION forming part of Letters Patent No. 313,215, dated March 3, 1885.

Application filed April 2, 1884. (No model.) Patented in England February 29, 1884, No. 4,158; in Germany March 11, 1884, No. 29,772; in France March 11, 1884, No. 160,863; in Belgium March 11, 1884, No. 64,467; in Russia March 25, 1884, No. 2,274; in Italy March 31, 1884, XVII, 16,555 and XXXIII, 22; in Spain August 8, 1884, No. 6,007; in Denmark September 10, 1884, and in Austria-Hungary September 28, 1884, No. 8,364 and No. 43,936.

*To all whom it may concern:*

Be it known that I, DANIEL LAUTENSACK, a subject of the Emperor of Austria-Hungary, residing at Vienna, in the Province of Nether-Austria, in the Empire of Austria-Hungary, have invented certain new and useful Improvements in Thermo-Electric Batteries; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of my invention is to provide a new and improved thermo-electric battery which is so constructed that it is more durable than the thermo-electric batteries made heretofore, and is also so constructed that the electrodes can be heated to a high degree without melting. In all thermo-electric batteries the positive electrodes are generally made of alloys containing antimony, as in the thermo-electric series antimony is the most electro-positive body; but, owing to the great brittleness of the antimonial alloys, the positive electrodes are very fragile. To overcome this difficulty, I cast the brittle positive electrodes on a core of tenacious metal covered with an insulating coating, which core also serves as the negative electrodes.

The details of construction and arrangement and connections of the parts will be fully set forth and described hereinafter.

Reference is to be had to the accompanying drawings, forming a part of this specification, in which similar letters of reference indicate corresponding parts in all the figures.

Figures 1, 2, and 3 show sectional views of different constructions of the couples of my improved thermo-electric battery. Fig. 4 is a plan of an annular chain or system formed of my improved thermo-electric couples. Fig. 5 is a vertical sectional view of a thermo-electric battery formed of a series of the annular chains of couples. Fig. 6 is a side view of the same.

In the thermo-electric couple shown in longitudinal section and two cross-sections in Fig. 1, the negative electrode $e'$ is composed, for example, of an alloy of copper and nickel, and constitutes the core for the positive electrode $e$, formed, for example, of an alloy of antimony and zinc. The negative electrode or core $e'$ is surrounded by an insulating-coating, $i$, preferably made from plumbago; but clay, porcelain, glass, or asbestus can be used in place of the plumbago. The negative electrode or core $e'$ has the shape of a bar, surrounded on all four sides, or only on three sides, by the metal of the positive electrode $e$, which has the shape of a prism, as shown in the drawings. The negative electrode or core $e'$ projects from both ends of the positive electrode $e$, and on one end of the positive electrode $e$ a piece of refractory neutral metal, $n$, is cast. In order to hold the piece $n$ securely on the positive electrode $e$, a dovetail tenon is formed on the end of the positive electrode $e$ and passed into a dovetail groove in the inner end of the piece $n$. In order to avoid overheating of both alloys, the piece $n$ is provided with side grooves or recesses, $v$, as shown in Fig. 1, or is lengthened, as shown in Fig. 2. Both electrodes are so arranged that the heat can be radiated freely in all directions. In the couple shown in Fig. 3 the core $n'$ does not serve as the negative electrode, but is in contact on all sides with the brittle alloy of the positive electrode $e$, for which it forms a support. In this case the negative electrode $e'$, being made of refractory metal, serves as the heat-receiving part. If a ring or chain of couples is to be formed, the negative electrodes $e'$, or cores, and the conductors $l$ of the positive electrodes $e$, projecting from the outer ends of the same, are connected with the negative electrodes $e'$ and the positive conductors $l$, respectively, of the adjacent couples in such a manner that all the couples are connected in series. To the couples thus united an annular or ring shape is given, whereby one heat-generator serves for all the couples. The pole-bars $e'$ $l$ or $l$ $l$ are connected by segmental or sector shaped prisms $l'$, cast on the ends of the said bars. The said prisms $l'$ offer very little resistance to the current, and increase the heat-radiating surface of the battery materially. One of the sectors or segments is cut into two parts, and each part is connected with a conducting-wire $p$ or $p'$.

A certain number of superposed annular chains, E, formed in the manner just described, form a thermo-electric pile or cylindrical battery. The annular chains E are separated from each other by narrow annular plates $k$, of asbestos or any other insulating material that is not subject to changes at variations in temperature up to 350° Celsius, 662° Fahrenheit. The cylindrical battery thus formed is provided with a top plate, A, and a bottom plate, A', united by screw-bolts B. In each thermo-electric chain E the interior extremities of the couples are separated from each other by layers $k'$ of asbestos or other suitable insulating material not subject to the changes at variations of temperature up to 350° Celsius, 662° Fahrenheit. In the interior of the cylindrical pile or battery a heat-generator is placed, which consists of a cylindrical stove, C, surmounted by a dome, D, provided with a smoke-stack, I, a fire-box door, K, and an ash-pit, L. The grate M is adapted to be turned, rocked, or moved in any other suitable manner. The outer walls of the stove C are not in direct contact with the heat-receiving metal pieces $n$ or $e'$; but between the said pieces and stove-wall an annular or cylindrical air space or chamber is formed. The air-chamber is closed at the top, but open at the bottom. The bottom plate, A', is provided with legs $ff$. The pole-wires $p$ and $p'$ of the several chains E may be connected with each other in series or in multiple arc, according to the effect desired. For this purpose a plate, S, of insulating material, and provided with terminals $s$, is fitted on the outside of the battery.

In order to protect the thermo-electric battery from accidentally coming in contact with objects, the battery is provided with a covering or casing, C', of wire-netting, which also increases the heat-radiating surface of the battery.

Having thus described my invention, what I claim as new, and desire to secure by Letters Patent, is—

1. A thermo-electric pair in which the brittle alloy of antimony forming the positive electrode surrounds the insulated negative electrode having projecting ends, and a piece of neutral metal destined to be heated is cast over one end of both electrodes, having either convenient length or a contracted or reduced portion, to prevent too strong heating of the electrodes, substantially as set forth.

2. In thermo-electric batteries the pairs of which are arranged around the heat-generator, a wire-cloth casing surrounding the whole battery and serving to increase the heat-radiating surface of the same, substantially as specified.

In testimony whereof I affix my signature in presence of two witnesses.

DANIEL LAUTENSACK.

Witnesses:
ADOLF KOHN,
CLARENCE M. HYDE.